Figure 1:
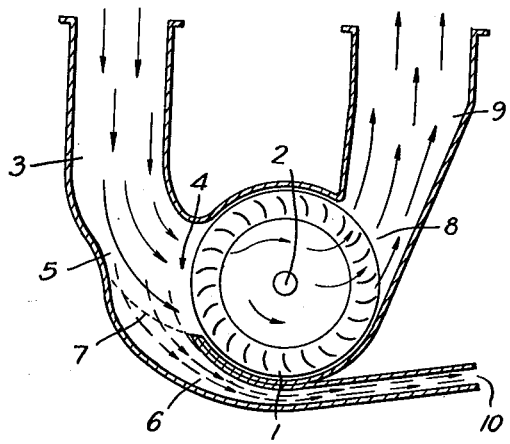

May 4, 1965 C. S. COCKERELL 3,181,637
MEANS TO ELIMINATE FOREIGN MATTER FROM THE GASEOUS
CURTAIN IN AIR SUPPORTED VEHICLES
Filed June 13, 1962 3 Sheets-Sheet 1

INVENTOR
C. S. COCKERELL
BY
Cameron, Kerkam + Sutton
ATTORNEYS

INVENTOR
C. S. COCKERELL

INVENTOR
C. S. COCKERELL

United States Patent Office 3,181,637
Patented May 4, 1965

3,181,637
MEANS TO ELIMINATE FOREIGN MATTER FROM THE GASEOUS CURTAIN IN AIR SUPPORTED VEHICLES
Christopher Sydney Cockerell, Bassett, Southampton, England, assignor to Hovercraft Development Limited, London, England, a British company
Filed June 13, 1962, Ser. No. 202,256
Claims priority, application Great Britain, June 13, 1961, 21,274/61
7 Claims. (Cl. 180—7)

This invention relates to the separation of debris and other foreign matter from the flow of fluid to a pump. If a fluid which is being fed to the intake of a pump contains foreign matter the operation of the pump may be interfered with and damage may also occur.

An application of the invention is for vehicles which in operation are supported by one or more cushions of pressurised gas, the cushions being contained for at least part of their peripheries by one or more curtains of moving fluid, the curtain being of the form in which at least part of the fluid forming a curtain is recovered and re-energised.

It will be appreciated that when a vehicle employing such a curtain formation is operated, foreign matter such as stones, sticks and the like are likely to be picked up by the curtain forming fluid and carried into the fluid circulating system. To prevent damage to or interference with the operation of the means by which the fluid is energised it may be desirable, or necessary, to prevent as much as possible of the foreign matter passing to the energising means. Further, when operating over water with gaseous curtains, it may be desirable to at least reduce the amount of water picked up by the flow of curtain forming gas which passes to the energising means.

According to the invention there is provided apparatus for the separation of debris and other foreign matter from a flow of fluid to a fluid energising means comprising an inlet duct connected at one end to the inlet of the energising means, the duct including a curved portion, and a further duct connected to the radially outer side of said curved portion whereby foreign matter in the fluid which flows towards the radially outer side of the inlet duct can be discharged through said further duct.

As stated above the invention is applicable to vehicles supported by gaseous cushions contained by fluid curtains and according to a feature of the invention there is provided fluid curtain forming means comprising fluid energising means, a supply duct connected to the outlet of the energising means for feeding the energised fluid to a supply port from which it issues to form the curtain, a recovery duct connected at one end to a recovery port in the bottom of the vehicle into which at least part of the curtain forming fluid is recovered, and at its other end to the inlet of the energising means whereby the recovered fluid is re-energised, the path of the recovery duct between the recovery port and the inlet of the energising means including a curved portion and a further duct connected to the radially outer side of said curved portion whereby foreign matter in the recovered fluid which flows towards the radially outer side of the recovery duct may be discharged through said further duct.

A particularly convenient arrangement is one in which the energising means is in the form of a pump positioned at the periphery of the vehicle. In such an arrangement, parallel supply and recovery ports are formed in the bottom surface of the vehicle, the recovery port being inboard of the supply port. The pump is positioned above the supply and recovery ports, the inlet and outlet of the pump being connected by ducts to the recovery and supply ports respectively. By suitable arrangement of ducts, any foreign matter contained in the recovered fluid can be caused to pass over the pump, by-passing it, and be ejected through a port outboard of the supply port. Thus according to a further feature of the invention in or for a vehicle of the kind referred to, there is provided curtain forming means comprising fluid energising means which extends for at least a part of the periphery of the vehicle, an inlet duct connected to the inlet of the energising means and an outlet duct connected to the outlet of said energising means, at least one recovery port connected to said inlet duct and at least one supply port connected to said outlet duct, said inlet and outlet ducts extending substantially parallel to each other, the inlet duct extending in a curved path to said energising means, the radially inner portion of the duct being connected to the inlet of the energising means, the radially outer portion of the duct being connected to a further duct which passes over the energising means and downwards to an outlet through which foreign matter may be discharged.

Figure 2:
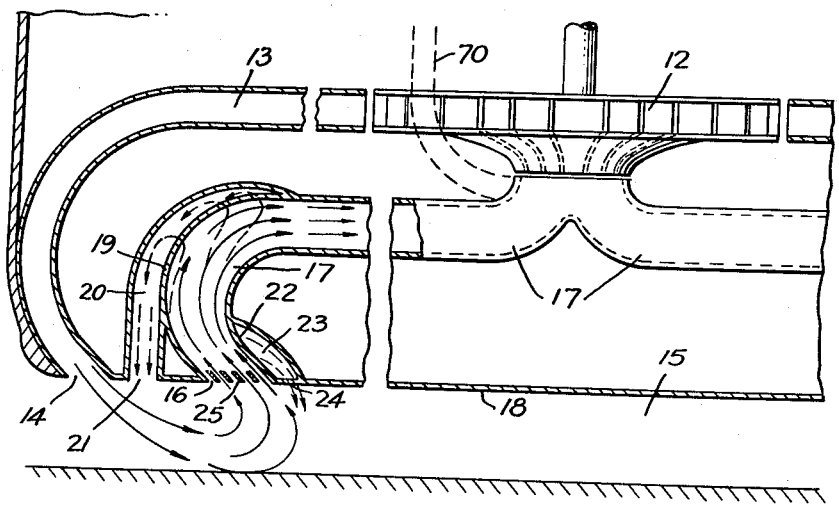
Figure 3:
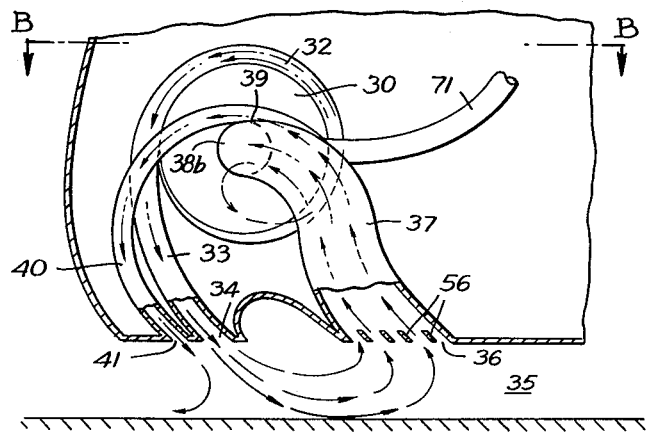
Figure 4:
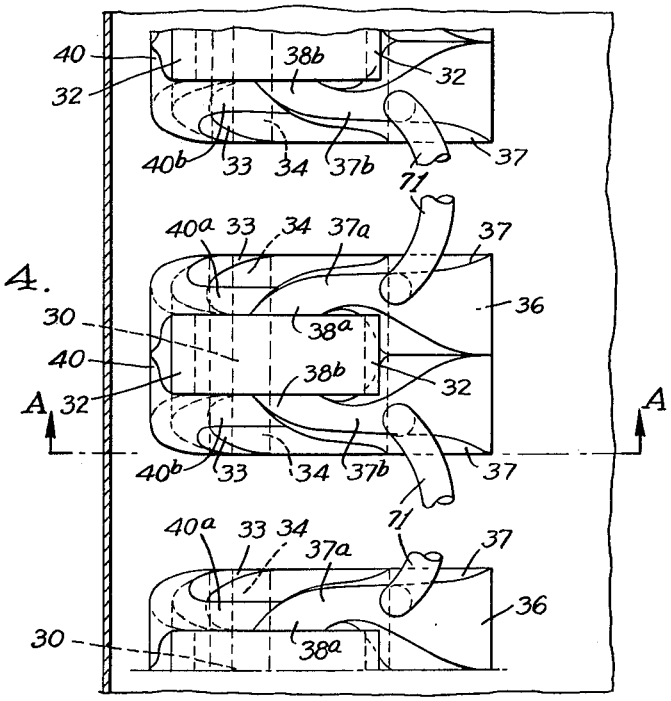
Figure 5:
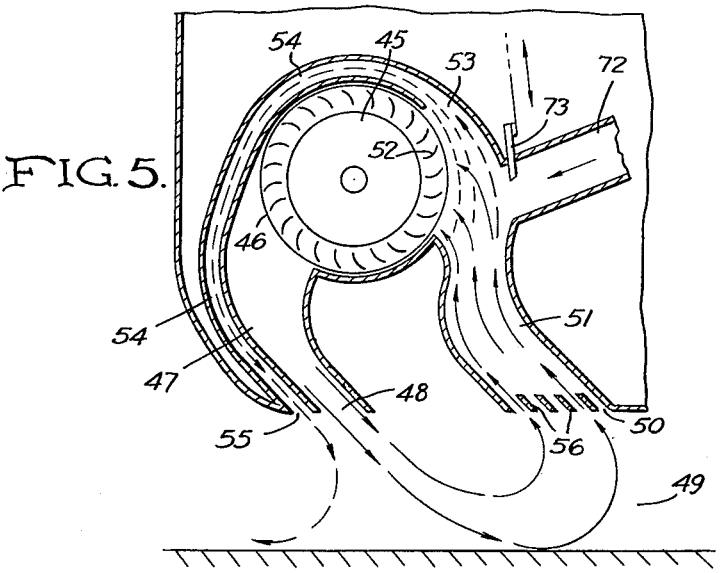

The invention will be readily understood by the following description of certain embodiments, by way of example, in conjunction with the accompanying drawings in which:

FIGURE 1 is a diagrammatic cross-section of one embodiment of the invention,

FIGURE 2 is a diagrammatic vertical cross-section through the lower part of a vehicle embodying the invention, FIGURE 3 is a diagrammatic vertical cross-section through the periphery of a vehicle, on the line A—A of FIGURE 4, illustrating another embodiment of the invention, FIGURE 4 is a diagrammatic plan view on the line B—B of FIGURE 3, FIGURE 5 illustrates the application of the embodiment illustrated in FIGURE 1 to a vehicle.

Figure 6:
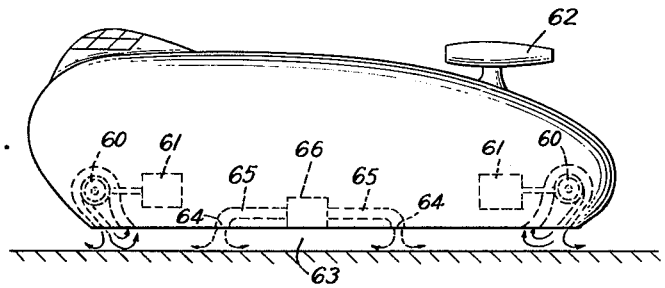
Figure 7:
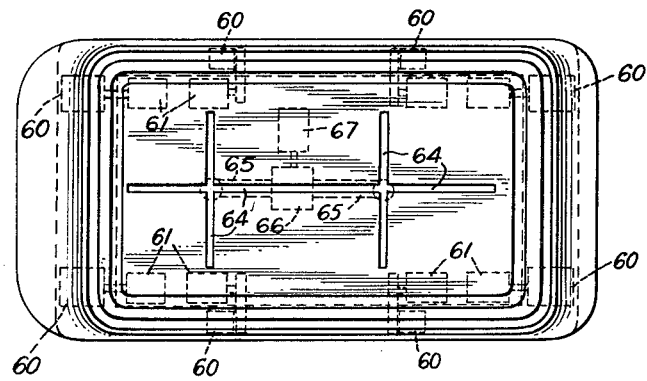

FIGURE 6 is a side elevation of a vehicle embodying the arrangement illustrated in FIGURE 5, and FIGURE 7 is an inverted plan view of the vehicle illustrated in FIGURE 6.

In the embodiment illustrated in FIGURE 1, the energising means 1 is a cross flow pump, rotating on a shaft 2. Fluid enters the pump via an inlet duct 3 which is connected to the inlet 4 of the pump. The duct 3 is curved at 5 and a further duct 6 is connected to the radially outer side 7 of the curved part of the inlet duct. Fluid flows from the outlet 8 of the pump into a supply duct 9.

In operation the fluid flows through the inlet duct 3 and is deflected round by the curve of the duct to the pump inlet 4. Any foreign matter in the fluid which is of a higher density than that of the fluid will tend to flow to the radially outer side of the inlet duct due to its momentum, and can then pass into the further duct 6. The foreign matter will issue from the outlet 10 of the further duct 6.

FIGURE 2 illustrates the application of the invention to a vehicle supported by one or more pressurised gaseous cushions. A curtain of moving fluid is formed at the periphery of the vehicle to contain the cushion or cushions and is of the type in which at least part of the curtain forming fluid is recovered, being re-energised at a position inboard of the curtain forming position. Thus air is fed from the re-energising means 12 through a supply duct 13 to a supply port 14. The air issues from the supply port in an inwards and downwards direction, and, when the pressurised gaseous cushion in the space 15 has been formed, is deflected round and upwards, flowing into a recovery port 16 inboard of and parallel to the supply port 14. From the recovery port the recovered air flows back to the re-energising means 12 through a recovery duct 17.

The recovery duct 17 extends from the recovery port in a curved path, the axis of curvature being substantially parallel to the bottom surface 18 of the vehicle body and inboard of the duct. The recovered air therefore flows along a path having a change of direction somewhat in excess of 90°. Although the air flows readily round the curve, any water, or other foreign matter such as sand etc., contained in the air tends to maintain a straight path due to its higher momentum, and impinges on the radially outer wall 19 of the recovery duct. The wall 19 of the duct is provided with slots, or the like, through which the water, and other foreign matter, can pass into a further duct 20. The water and other foreign matter is discharged from the duct 20 through an outlet port 21 positioned between supply port 14 and recovery port 16.

Due to the deflection of the air curtain by the cushion pressure, some of the water, and other foreign matter, is likely to impinge on the inner wall 22 of the recovery duct immediately above the recovery port 16. This portion of the wall can also be provided with slots or the like through which the water can pass into a duct 23, being discharged through a further outlet port 24 positioned inboard of recovery port 16. In an alternative arrangement, slots may be formed in the wall 19, and also in the wall 22, either by causing the upper edge of the slot to project into each recovery duct or the lower edge to project into the duct 20, or the duct 23, or by both such methods. The number and position of the slots may vary. Vanes 25 may be provided in the recovery port 16 to prevent the entry of any foreign matter which is too large to pass through the slots etc. in the wall of the recovery duct.

FIGURES 3 and 4 illustrate the application of the invention to a curtain forming system in which, when installed in a vehicle, the energising means is positioned at the periphery of the vehicle and substantially parallel thereto. The energising means is in the form of a series of pumps 30, in the present example each being a double-sided centrifugal pump. In operation air flows from the outlet of the pump through a volute 32 which delivers into a supply duct 33 and thence to a supply port 34 in the bottom surface of the vehicle body. From the supply port the air issues in an inwards and downwards direction. When the cushion of pressurised air in the space 35 has been formed, the curtain of air is deflected round and upward by the cushion pressure, the air flowing into a recovery port 36 inboard of and substantially parallel to the supply port 34. From the recovery port 36 the air flows into a recovery duct 37. The recovery duct divides into two branches 37a and 37b (FIGURE 4) and feeds the air to the inlets 38a and 38b of the pumps. Prior to reaching the pump inlet, the recovery duct branches extend in curved paths, about an axis substantially parallel to the bottom surface of the vehicle, the axis being outboard of the recovery port 36. Due to the curving of the ducts, water and any other foreign matter tends to flow to the radially outer sides 39 of the ducts. Slots are formed in these outer sides and the water and other foreign matter passes into further ducts 40a and 40b. The further ducts 40a and 40b pass either side of the pump 30 and the volute 32 and eventually join into a common duct 40. At its lower end this duct 40 terminates in an outlet port 41 positioned adjacent to and outboard of supply port 34.

A cross-flow pump as illustrated in FIGURE 1 is a convenient form of energising means for positioning at the periphery of the vehicle, or at any other position adjacent to the actual formation position of a curtain. FIGURE 5 is a vertical cross-section of such a pump when so installed. The air flows from the pump 45 via outlet 46 to a supply duct 47. The supply duct is connected at its lower end to a supply port 48 from which issues the air in an inwards and downwards direction in the form of a curtain. The air is deflected round and upwards by the pressure of the cushion in space 49 and flows into a recovery port 50 inboard of and parallel to the supply port 48. The recovered air flows through a recovery duct 51 to the inlet 52 of the pump.

The recovery duct extends in a curved path, as in the example illustrated in FIGURES 3 and 4. The radially outer side opens at 53 into a further duct 54 which passes over the top of the pump 45 and continues down immediately outboard of the supply duct 47. At its lower end the further duct 54 terminates in an outlet port 55 positioned adjacent to and outboard of supply port 48. The arrangements illustrated in FIGURES 2, 3, 4, 5 provide particularly convenient arrangements when operating over water with air or other gas curtains. The water, along with other foreign matter, will tend to be directed into the ducts 40 or 54 and issue from the outlet ports 41 or 55 to form a water curtain which will assist the air curtain formed from the supply ports 34 or 48. Any air which passes through the ducts 40 or 54 will also similarly act to form a curtain and the energy of this air will not be entirely wasted. In order to prevent blocking of the ducts or the outlet ports it is preferred to provide vanes 56 in the recovery ports 36 or 50, the vanes being spaced so that no foreign matter larger than that which can pass through the duct and port can enter the recovery port.

The invention, although described above in relation to air or other gas curtains, is applicable also to water curtains. In such cases, the foreign matter which is separated will, of course, only consist of that which has a higher momentum than the water, e.g. stones.

The auxiliary supply of fluid can be supplied in various ways. Thus, in FIGURE 2 air can be fed to the pump inlet by means of a duct, indicated by dotted lines 70, leading from the atmosphere. Alternatively, the pump can be double sided, one side connected to the recovery duct 17 and the other to the atmosphere. In FIGURES 3 and 4, additional air can be supplied through a duct 71 connected to the recovery duct 37. In the example illustrated in FIGURE 5, additional air may be supplied to the pump by means of a duct 72 connected to the recovery duct 51. A valve 73 can be provided to control the amount of air supplied via the duct 72. The air supplied through the duct 72 can be from the atmosphere. Alternatively it can be supplied from any other source and can be pressurised.

FIGURES 6 and 7 illustrate a vehicle in which the energising means is in the form of a series of pumps of the type illustrated in FIGURE 5 positioned around the periphery of the vehicle. The pumps 60 extend for substantially the whole of the periphery being driven by engines 61. The vehicle is propelled by a gas turbine engine 62. The cushion space 63 is subdivided by further curtains of air issuing through ports 64 formed in the bottom of the vehicle and fed via ducts 65. The air for these curtains is energised by compressors 66 driven by engines 67. The air forming these curtains is normally of a simple formation with no recovery. If however these curtains are of the form in which at least part of the air is recovered then the invention can be applied to the system.

I claim:
1. In a vehicle for operating over a surface of the type adapted to be supported above that surface by at least one cushion of pressurised gas formed and contained beneath the body of the vehicle, the combination of a supply port formed in the bottom of the vehicle body adjacent to the periphery thereof, fluid energising means having an inlet and an outlet for causing a fluid to issue from said supply port and form a curtain of moving fluid travelling across the gap existing between said vehicle body and said surface, said curtain in combination with said body and said surface effectively enclosing a gas-containing space between the bottom of said body and said surface wherein said cushion of pressurised gas is formed, a recovery port formed in the bottom of said vehicle body and extending substantially parallel to said supply port into which at least part of the fluid forming said curtain may flow back into said body, a recovery duct connecting said recovery port to the inlet of said energising means through which the recovered part of the curtain forming fluid may flow back to said energising means for recirculation in said curtain, said recovery duct including a curved portion having at least one outlet opening in the radially outer side thereof, an outlet port formed in the bottom of said vehicle body, and a further duct connected at one end to said outlet opening in the radially outer side of the curved portion of said recovery duct and at the other end to said outlet port, whereby foreign matter in the recovered part of said curtain forming fluid may be separated from said fluid as it flows through the curved portion of said recovery duct and discharged through said further duct and outlet port.

2. A vehicle as claimed in claim 1 wherein said outlet port is positioned outboard of and closely adjacent to said supply port, whereby any fluid which is discharged with the foreign matter through said further duct and outlet port forms a further curtain supplementing the fluid curtain which issues from said supply port.

3. A vehicle as claimed in claim 1 wherein said fluid energising means comprises a rotary pump having its axis of rotation substantially parallel to said supply and recovery ports.

4. In a vehicle for operating over a surface of the type adapted to be supported above that surface by at least one cushion of pressurised gas formed and contained beneath the body of the vehicle, the combination of a supply port formed in the bottom of the vehicle body adjacent to the periphery thereof and so arranged as to eject fluid therefrom in an inward direction relative to said periphery, fluid energising means having an inlet and an outlet for causing a fluid to issue from said supply port and form a curtain of moving fluid travelling across the gap existing between said vehicle body and said surface, said curtain in combination with said body and said surface effectively enclosing a gas-containing space between the bottom of said body and said surface wherein said cushion of pressurised gas is formed, a recovery port formed in the bottom of said vehicle body positioned a short distance inboard of and extending substantially parallel to said supply port into which at least part of the fluid forming said curtain is deflected by the pressure of said cushion, a recovery duct connecting said recovery port to the inlet of said energising means through which the recovered part of the curtain forming fluid may flow back to said energising means for recirculation in said curtain, said recovery duct including a curved portion having at least one outlet opening in the radially outer side thereof, an outlet port formed in the bottom of said vehicle body outboard of said supply port, and a further duct connected at one end to said outlet opening in the radially outer side of the curved portion of said recovery duct and at the other end to said outlet port, whereby foreign matter in the recovered part of said curtain forming fluid may be separated from said fluid as it flows through the curved portion of said recovery duct and discharged through said further duct and said outlet port, any fluid which is discharged with the foreign matter through said further duct and outlet port forming a further curtain supplementing the fluid curtain which issues from said supply port.

5. A vehicle as claimed in claim 4 including an additional duct connected to said recovery duct through which additional fluid may be supplied to said energising means.

6. In a vehicle for operating over a surface of the type adapted to be supported above that surface by at least one cushion of pressured gas formed and contained beneath the body of the vehicle, the combination of a supply port formed in the bottom of the vehicle body adjacent to the periphery thereof and so arranged as to eject fluid therefrom in an inward direction relative to said periphery, a recovery port formed in the bottom of said vehicle body positioned a short distance inboard of and extending substantially parallel to said supply port, a rotary pump mounted in said vehicle body above said supply and recovery ports and having its axis of rotation extending substantially parallel to said ports, said pump having an inlet positioned outboard of said recovery port and an outlet, a recovery duct connecting said recovery port to the inlet of said pump, said pump causing a fluid to issue from said supply port and form a curtain of moving fluid which in combination with said vehicle body and said surface effectively encloses a gas-containing space between the bottom of said body and said surface wherein said cushion of pressurised gas is formed, at least part of the fluid forming said curtain flowing into said recovery port and through said recovery duct back to the inlet of said pump for recirculation in said curtain, said recovery duct extending upwardly from said recovery port and then curving round and outwardly toward the periphery of the vehicle body to the inlet of said pump, the curved portion of said recovery duct having at least one outlet opening in the radially outer side thereof, an outlet port formed in the bottom of said vehicle body outboard of said supply port, and a further duct having its inner end connected to said outlet opening in the radially outer side of the curved portion of said recovery duct and curving outwardly above the inlet of said pump and then downwardly to said outlet port, whereby foreign matter in the recovered part of said curtain forming fluid flowing through the curved portion of said recovery duct may move toward the radially outer side of said duct and flow into said further duct for discharge through said outlet port.

7. In a vehicle for operating over water of the type adapted to be supported above the surface of the water by at least one cushion of pressurised gas formed and contained beneath the body of the vehicle, the combination of a supply port formed in the bottom of the vehicle body adjacent to the periphery thereof and so arranged as to eject gas therefrom in an inward direction relative to said periphery, a recovery port formed in the bottom of said vehicle body positioned a short distance inboard of and extending substantially parallel to said supply port, rotary gas energising means having an inlet and an outlet mounted in said vehicle body above said supply and recovery ports with its axis of rotation extending substantially parallel to said ports, the inlet of said energising means being positioned outboard of said recovery port, a recovery duct having its lower end connected to said recovery port and its upper end connected to the inlet of said energising means, said energising means causing a gas to issue from said supply port and form a curtain of moving gas which in combination with the vehicle body and the surface of the water effectively encloses a gas-containing space beneath said body wherein said cushion of pressurised gas is formed, at least part of the gas forming said curtain being recovered into said recovery port and flowing through said recovery duct back to the inlet of said energising means for recirculation in said curtain, said recovery duct extending upwardly from said recovery port and then curving round and outwardly toward the periphery of the vehicle body to the inlet of said energising means, the curved portion of said recovery duct having at least one outlet opening in the radially outer side thereof, an outlet port formed in the bottom of said vehicle body outboard of and extending substantially parallel to said supply port, and a further duct having its inner end connected to said outlet opening in the radially outer side of the curved portion of said recovery duct and curving outwardly above the inlet of said energising means and then downwardly to said outlet port, whereby any water induced into the recovery port by the flow of the recovered part of the curtain forming gas may move toward the radially outer side of said recovery duct and flow through said outlet opening into said further duct and issue from said outlet port to form a further curtain of moving fluid which supplements said curtain of moving gas.

References Cited by the Examiner

UNITED STATES PATENTS

| | | | |
|---|---|---|---|
| 1,312,798 | 8/19 | Meyers et al. | 209—143 |
| 2,283,483 | 5/42 | Arnold | 209—143 |
| 2,386,196 | 10/45 | Dalin | 209—143 |
| 2,808,893 | 10/57 | Dorman et al. | 180—54 |

FOREIGN PATENTS

| | | |
|---|---|---|
| 1,240,721 | 8/60 | France. |
| 1,263,704 | 5/61 | France. |

A. HARRY LEVY, *Primary Examiner.*